(12) United States Patent
Chapman

(10) Patent No.: US 7,209,176 B2
(45) Date of Patent: Apr. 24, 2007

(54) THREE-AXIS REMOTE CAMERA HEAD

(75) Inventor: Leonard T. Chapman, North Hollywood, CA (US)

(73) Assignee: Chapman/Leonard Studio Equipment, North Hollywood, CA (US)

( * ) Notice: Subject to any disclaimer, the term of this patent is extended or adjusted under 35 U.S.C. 154(b) by 0 days.

(21) Appl. No.: 10/782,034

(22) Filed: Feb. 19, 2004

(65) Prior Publication Data
US 2005/0185089 A1 Aug. 25, 2005

(51) Int. Cl.
*H04N 5/225* (2006.01)
*G03B 17/00* (2006.01)
*F16M 11/04* (2006.01)
*E04G 5/00* (2006.01)

(52) U.S. Cl. .................. 348/373; 348/375; 248/187.1; 248/292.12; 396/428

(58) Field of Classification Search ................ 348/373, 348/375–376, 81; 396/419, 428; 248/187.1, 248/276.1, 292.12, 660–661
See application file for complete search history.

(56) References Cited

U.S. PATENT DOCUMENTS

| | | | |
|---|---|---|---|
| 2,961,877 A | 11/1960 | Edwards | |
| 3,035,477 A | 5/1962 | Bosch et al. | |
| 3,069,912 A | 12/1962 | Faux et al. | |
| 3,218,015 A | 11/1965 | Baer | |
| 3,378,326 A | 4/1968 | Alvarez | |
| 3,437,397 A | 4/1969 | Humphrey | |
| 3,473,861 A | 10/1969 | Humphrey | |
| 3,504,957 A | 4/1970 | Heflinger et al. | |
| 3,552,216 A | 1/1971 | Pasquet | |
| 3,556,632 A | 1/1971 | Deramond | |
| 3,703,999 A | 11/1972 | Forys et al. | |
| 3,845,929 A | 11/1974 | Reekie et al. | |
| 4,256,279 A | 3/1981 | Duel | |
| 4,821,043 A | 4/1989 | Leavitt | |
| 4,989,466 A | 2/1991 | Goodman | |
| 5,083,147 A * | 1/1992 | Nakatani | 248/179.1 |
| 5,316,412 A * | 5/1994 | Sondergard | 405/169 |
| 5,463,432 A * | 10/1995 | Kahn | 352/243 |
| 5,697,757 A * | 12/1997 | Lindsay | 414/744.6 |
| 5,856,862 A | 1/1999 | Kokush | |
| 5,868,031 A | 2/1999 | Kokush et al. | |
| 5,871,249 A | 2/1999 | Williams | |

(Continued)

OTHER PUBLICATIONS

Merriam-Webster's Colligate Dictionary, "(2)Fluid", 1997, Springfield, Massachusetts: Merriam-Webster, Inc., Tenth Edition, p. 449.*

(Continued)

*Primary Examiner*—Ngoc-Yen Vu
*Assistant Examiner*—Carramah J. Quiett
(74) *Attorney, Agent, or Firm*—Perkins Coie LLP

(57) ABSTRACT

A remote camera head has a tilt frame attachable to a pan frame at multiple positions. A roll frame is attachable to the tilt frame at multiple positions. The camera head can be expanded or reduced in size as needed based on the space requirements of the camera and camera accessories mounted on the camera head. Waterproof or sealed slip ring assemblies and connectors allow the camera head to operate in wet environments, or even when submerged in water. The camera head can be quickly installed, set up, balanced, or reconfigured.

10 Claims, 19 Drawing Sheets

U.S. PATENT DOCUMENTS

| | | | |
|---|---|---|---|
| 6,154,317 A | | 11/2000 | Segerstrom et al. |
| 6,517,207 B2* | | 2/2003 | Chapman ................... 352/243 |
| 6,965,411 B1* | | 11/2005 | Jones ........................ 348/373 |
| 2001/0048468 A1* | | 12/2001 | Fantone et al. ............... 348/81 |

OTHER PUBLICATIONS

Brochure: HydroFlex®—Hydrohead™ (Jan. 2003).
Information Sheet: Pace Aquahead™ (Jan. 2003).
Information Sheet: Power Pod (Remote Camera System) (Jan. 2002).
Information Sheet: Hot Head Remote Camera (with Preston System) (Jan. 2002).
Information Sheet: Weaver Steadman's 'ds Remote™ Camera System (with Preston System) (Jan. 2002).
Chapman/Leonard Studio Equipment, Inc. Catalog, pp. 105-108 (Jun. 2005).
International Bureau of WIPO, "International Preliminary Report on Patentability" for PCT/US2004/029036, Mar. 16, 2006.

* cited by examiner

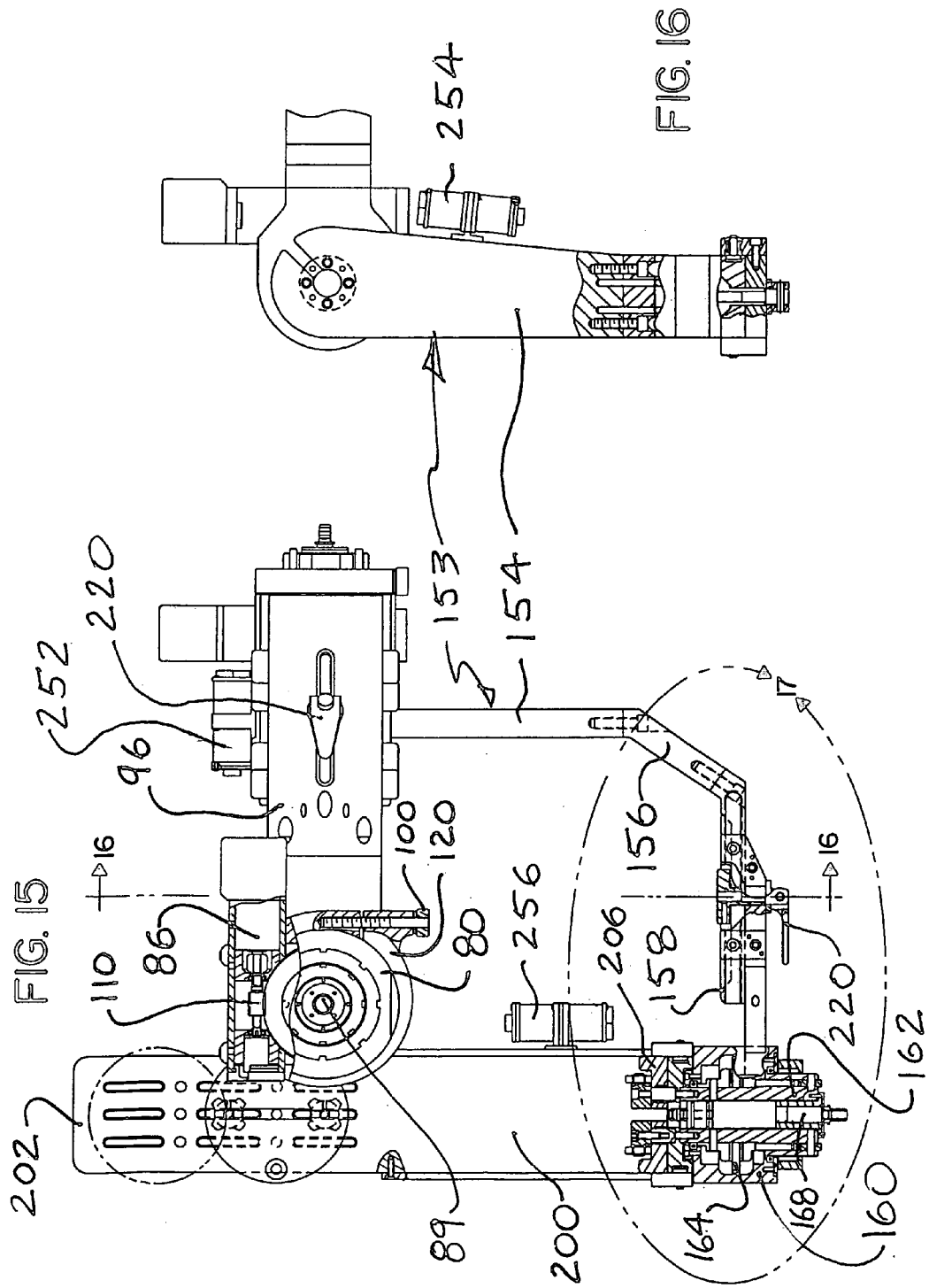

THREE-AXIS REMOTE CAMERA HEAD

BACKGROUND OF THE INVENTION

In motion picture, television, or video filming or recording, the camera is often supported on a vehicle, to follow an action or moving sequence, to achieve a desired camera angle or effect, or to film occupants in or on a vehicle. Various specialized camera cranes, dollys, and other mobile platforms have been used for this purpose.

Over the last several years, remote camera heads have increasingly been used. A remote camera head is an apparatus that allows the camera to be moved, aimed, or controlled from a remote location (i.e., a location not immediately behind the camera). Typically, a remote camera head is mounted on a crane arm. The crane arm can move the camera head, and the camera on the head, into locations not accessible using conventional camera operations (i.e., with a camera operator behind the camera and controlling camera movement by hand). For example, a camera on a camera head may be suspended on a crane arm extending out over the side of a tall building, a cliff, a waterfall, etc., i.e., in a position where it would be unsafe, impractical, or impossible to perform conventional camera operations.

In general, remote camera head operations involve placing the camera on a remote camera head which can perform pivoting or rotational movement in three axes, known as pan, tilt, and roll or dutch. Electric motors on or in the remote camera head are remotely controlled (via cables or wireless links) by a camera head operator, typically on the ground, or on the vehicle supporting the crane arm. Operation of the camera itself is similarly remotely controlled.

While camera heads have been successfully used in the past, several disadvantages remain. As camera heads generally have various electrical and electronic components (motors, sensors, etc.), they are typically limited to use only in clean and dry conditions. Adverse environmental conditions, such as rain, snow, dust, sand, etc., can often cause degraded performance or failures with camera heads. Accordingly, there is a need for a rugged camera head providing reliable performance in all weather conditions.

Many camera heads are relatively difficult and time consuming to set up, balance, operate, or reconfigure. Since production time can be extremely expensive, even short delays associated with use of a camera head can be disadvantageous. Consequently, there is a need for a camera head which can be quickly and easily transported, installed, and made ready for use.

Many camera heads are set up for remote control using motors which drive or move components of the camera head. However, to preview lens angles, or for other reasons, a camera operator may want to manually position the camera. This typically requires that the motors be disconnected or disengaged, to allow the camera head to be easily moved by hand. Unfortunately, with many camera heads, this disengagement for hand movement, can be time consuming and difficult. Similarly, re-engaging or reconnecting the motors for electrical movement of the camera head, can also be time consuming.

Accordingly, various engineering challenges remain in designing an improved camera head.

SUMMARY OF THE INVENTION

After extensive research and development, the various engineering challenges described above associated with camera heads have now been overcome in a new system providing significantly improved performance and advantages. These advantages include all weather operation, submerged operation, rapid set-up and adjustment, wide ranging adaptability for handling cameras of various shapes, sizes, and weight, and improved performance features and characteristics.

In a first aspect, a camera support or camera head has a pan frame, a tilt frame securable onto the pan frame at multiple positions on the pan frame, and a tilt frame securable onto the pan frame at multiple positions on the pan frame. A quick release lever is advantageously used to secure the frames at desired positions, to configure the camera head as desired.

In a second aspect the pan frame includes a pan housing, a pan arm rotatably attached to the pan housing and a pan motor for moving the pan arm relative to the pan housing. The tilt frame includes a tilt housing, a tilt arm rotatably attached to the tilt housing and a tilt motor for moving the tilt arm relative to the tilt housing. The tilt frame is securable onto the pan arm at multiple positions along the pan arm. In an additional aspect of the invention, a roll frame is also included, having a roll housing and a camera platform rotatably attached to the roll housing, and a roll motor for moving the camera platform relative to the roll housing. In this design, the roll frame is also securable onto the tilt arm at multiple positions along the tilt arm. Since the frames or arms can be quickly moved into a desired position, and then securely locked into place, via a cam lever or other locking device, the camera head can be quickly and easily configured to carry a wide range of cameras and/or related equipment.

In a third aspect of the invention, a camera head includes a slip ring assembly for each axis of rotation, and with water proof cable segments extending between the slip ring assemblies. Electrical connections are made water proof or resistant. Bearings within the camera head are sealed. This allows the camera head to be used in the rain, or even underwater, without loss of performance.

In a fourth aspect of the invention, a pan or first shaft is rotatably supported within a pan or first housing. A tilt or second frame is attached to the first shaft, and the first shaft is sealed against the first housing. A first gear is linked to the first shaft through a first clutch. The first gear is linked to the first motor. At least one clutch operation lever on the housing is moveable from a first position, wherein the lever engages the first clutch to allow the first motor to drive the first shaft, to a second position, wherein the lever disengages the first clutch, allowing the first shaft to rotate free of the motor. This allows for quickly switching the camera head over between, automatic operation (via the motors), to manual operation (i.e., positioning the camera by hand). In addition, since the motors are de-coupled during manual operation, only low force is needed to move the frames. This makes precise camera positioning easier and faster.

The invention resides as well in subcombinations of the elements described.

BRIEF DESCRIPTION OF THE DRAWINGS

In the drawings, wherein the same element number indicates the same element in each of the views:

FIG. 15 is a plan view of the camera head shown in FIGS. 4 and 10.

FIG. 16 is a side elevation view of the tilt frame, taken along line 16—16 of FIG. 15.

DETAILED DESCRIPTION OF THE DRAWINGS

Figure 1:
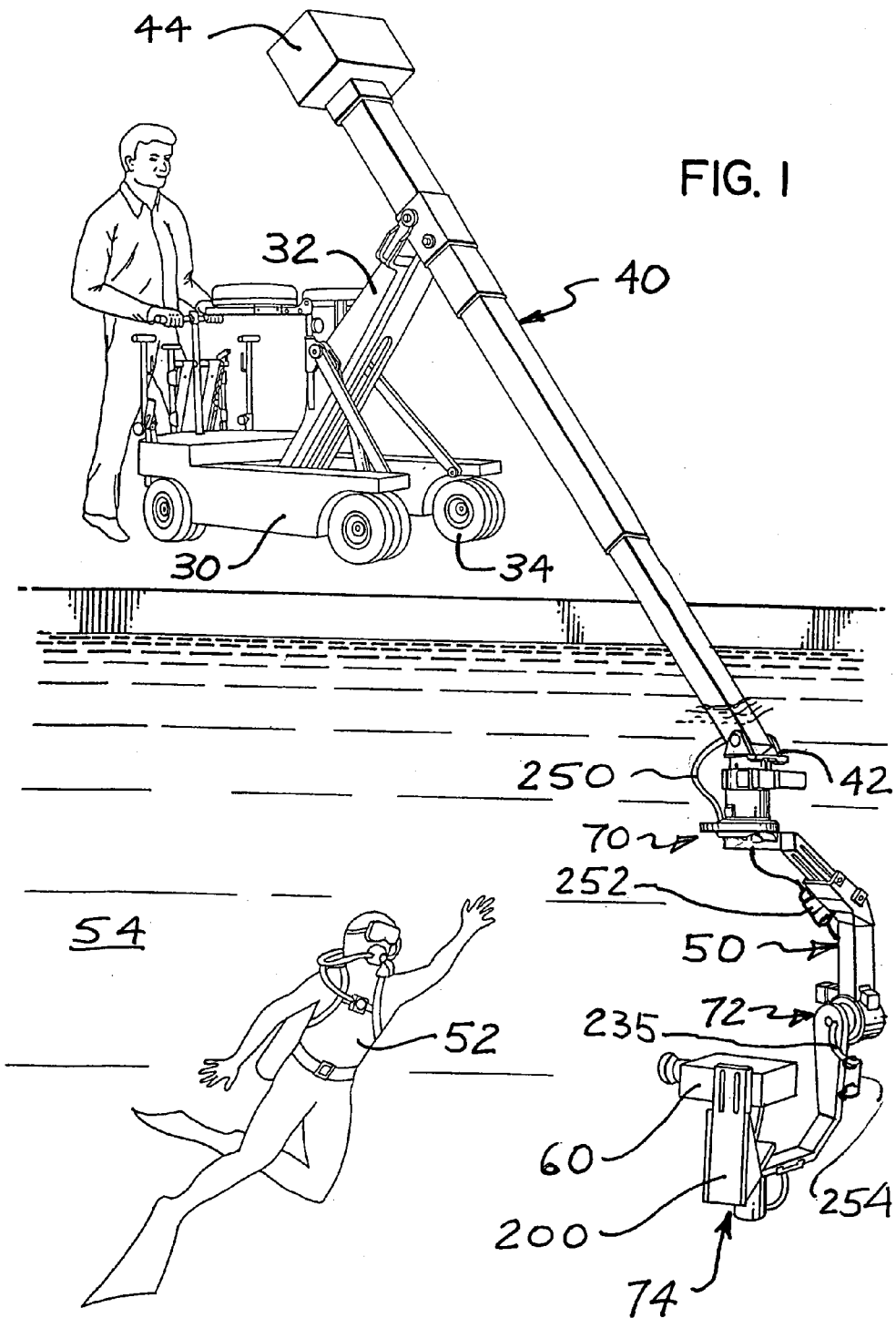
FIG. 1 is a perspective view of the present camera head in use.

Turning now in detail to the drawings, as shown in FIG. 1, the camera head 50 of the invention is supported on the nose or front end 42 of a crane arm 40. The crane arm 40 is supported on an arm or post 32 of a mobile dolly 30. The dolly 30 is typically on wheels 34, so that it can easily be maneuvered and steered. Counterweights 44 are typically provided at the back end of the crane arm 40, for balancing.

In FIG. 1, a motion picture or video camera 60 is attached onto the head 50. The front end or nose 42 of the crane arm 40, the head 50, and the camera 60 are submerged in a pool or tank of water 54, to film an action sequence of a diver 52. Of course, FIG. 1 shows but a single example of use of the camera head 50. In practice, the camera head 50 can be mounted on various motorized camera cranes, carts, dollys or other mobile bases, to position and maneuver a camera 60 at elevated positions, near ground level positions, below ground level positions, within interior spaces of buildings or enclosures, etc. Indeed, the camera head 50 may be used in any application where remote positioning and maneuvering of a camera 60 is desired.

Figure 2:
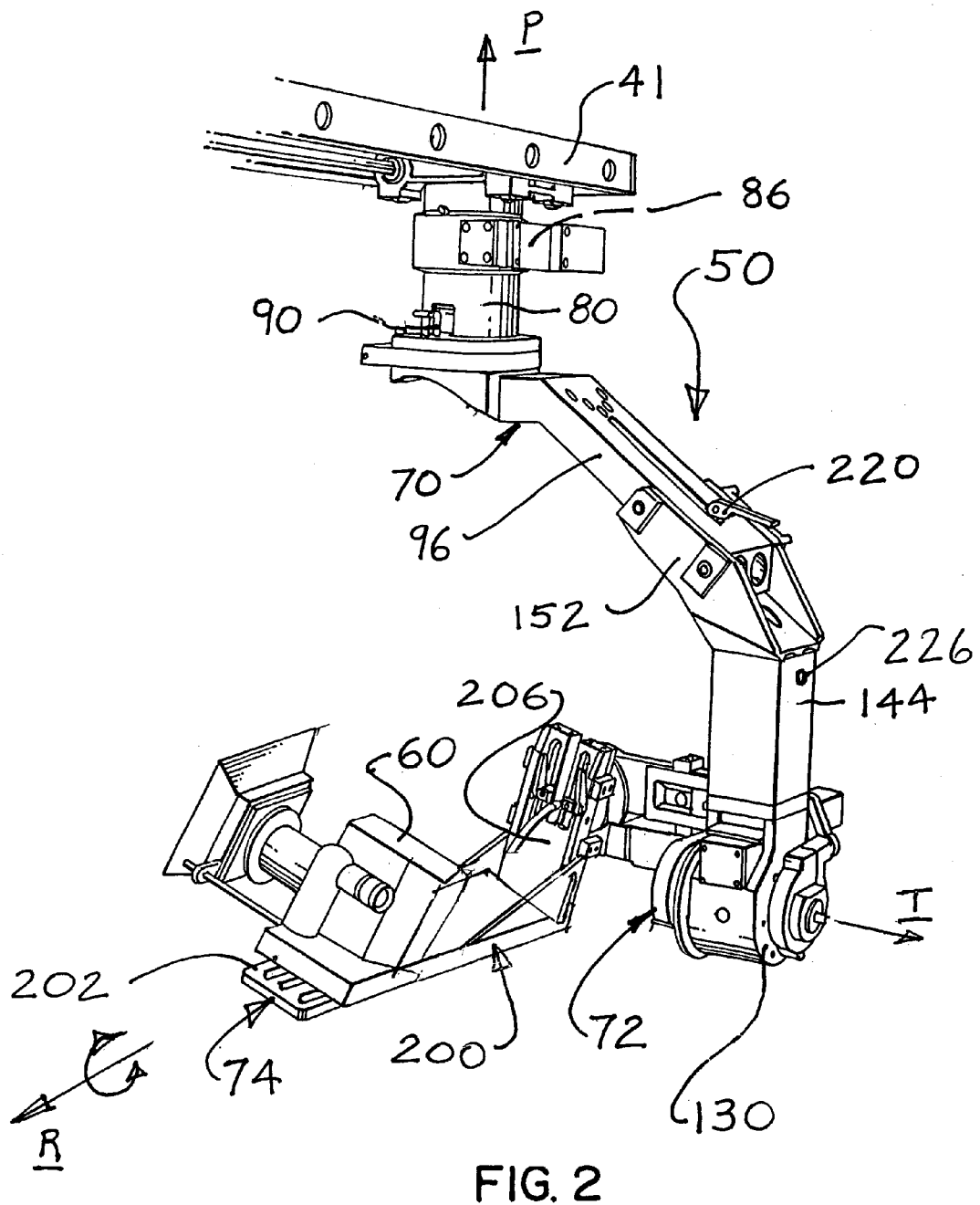
FIG. 2 is a perspective view of the camera head shown in FIG. 1, in an upright position.
Figure 3:
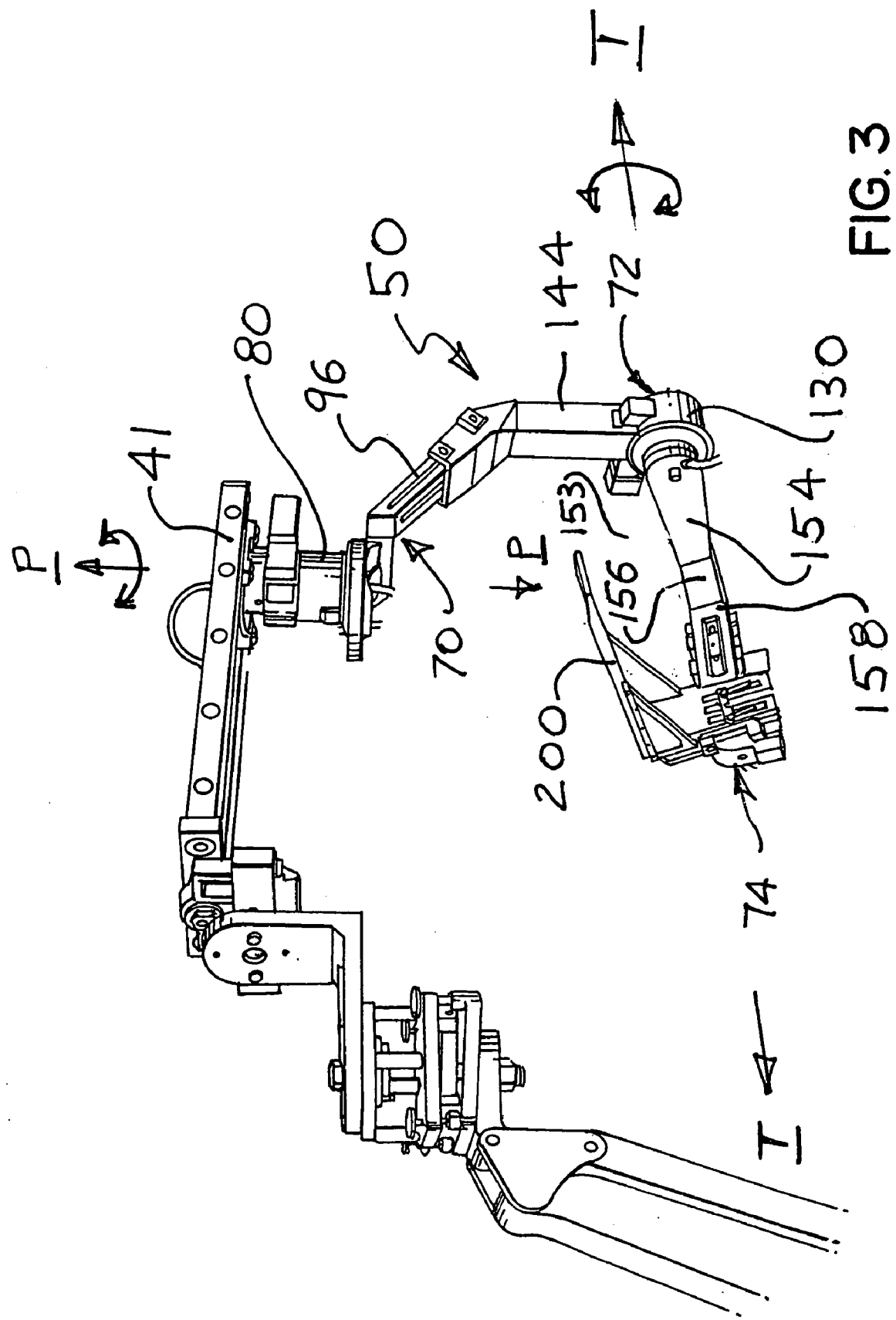
FIG. 3 is a perspective view of the camera head shown in FIG. 2, with the camera platform inverted.

In FIGS. 2 and 3, the camera head 50 is shown supported on a track 41 of an alternative camera crane or dolly. The camera head 50 comprises three principle assemblies or units, specifically a pan frame generally indicated at 70, a tilt frame generally indicated at 72, and a roll or dutch frame generally indicated at 74. The pan frame 70 is supported on a crane arm 40, track 41 or similar support and provides pivoting or rotational movement about a pan-axis P, typically a vertical upright axis. This allows the camera 60 to be moved with a panning or clockwise/counterclockwise sweeping horizontal movement. The tilt frame 72 supported on the pan frame 70 provides for pivoting or rotational movement about a tilt axis T, to change the elevation angle of the camera 60. The roll frame 74 which is supported on the tilt frame 72 provides for pivoting or rotational movement about a roll axis R. In contrast to FIG. 2, FIG. 3 shows the camera platform inverted, at a near 180° roll or "dutch" angle. Since the camera head 50 allows the camera 60 to be pivoted or rotated about each of the three axes, the lens of the camera 60 can be moved into any desired angular position.

Figure 4:
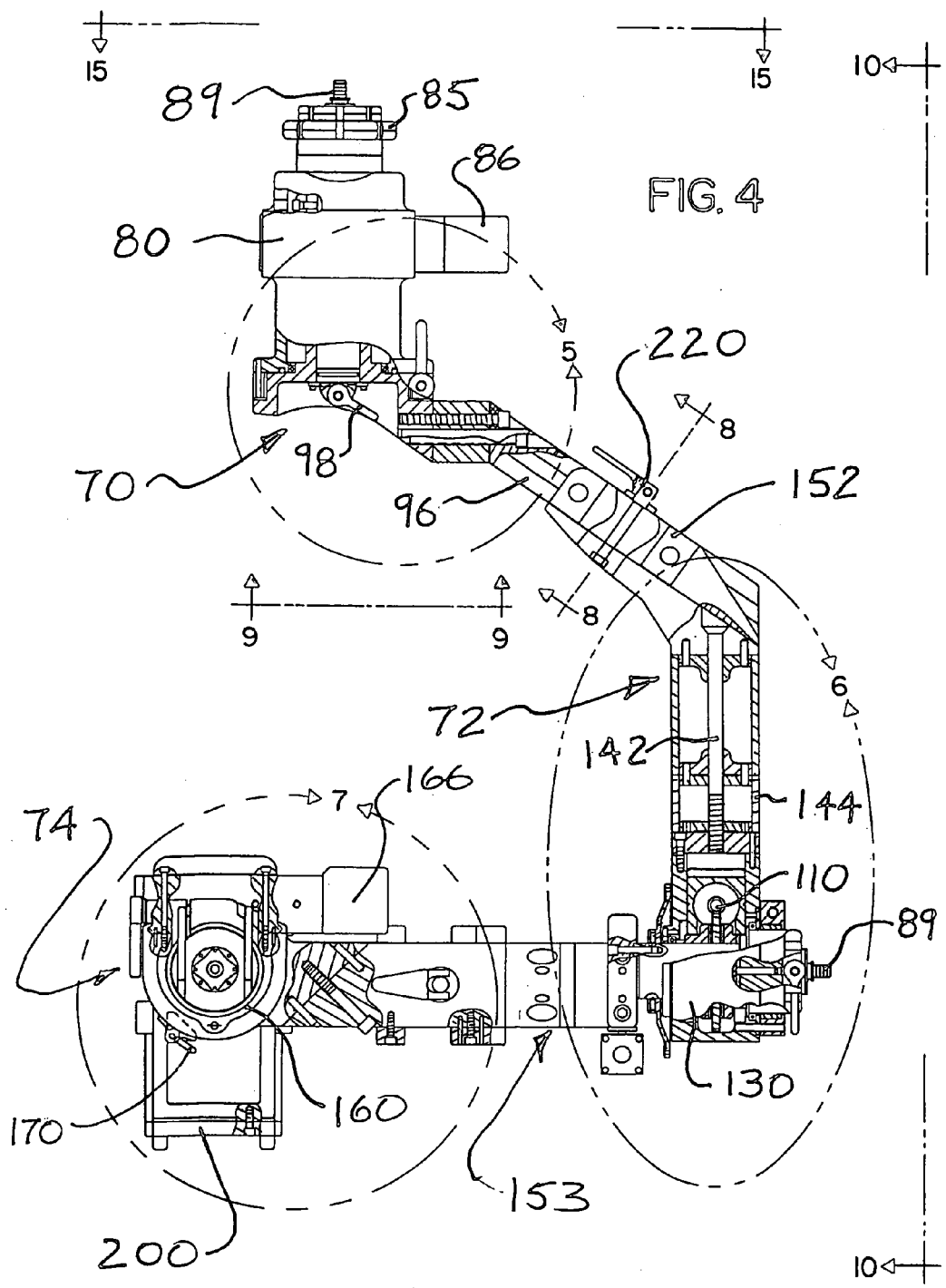
FIG. 4 is a side view, in part section, of the camera head shown in FIGS. 2 and 3, with the camera and electrical components omitted for clarity of illustration.
Figure 5:
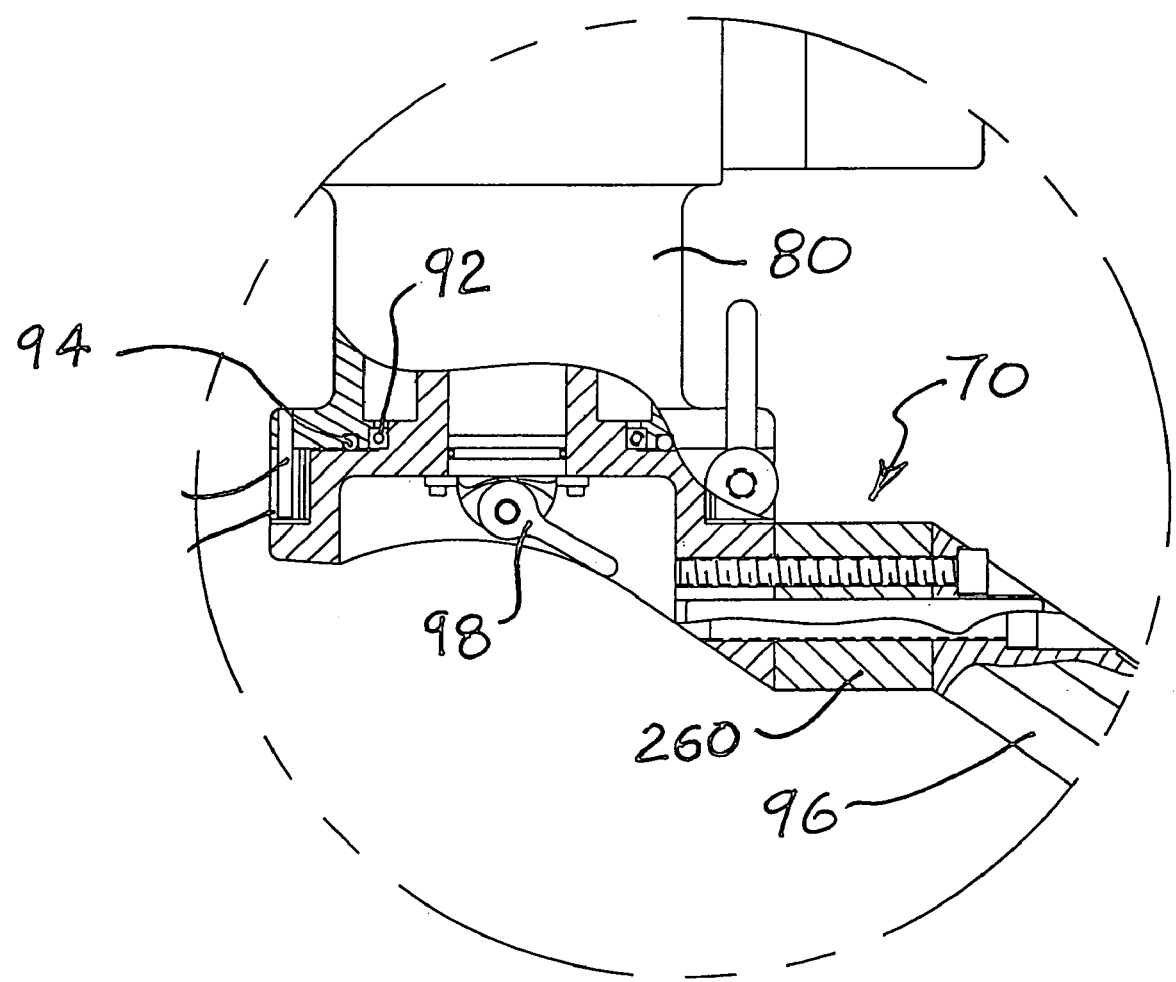
FIG. 5 is an enlarged detail view, in part section, of the pan frame shown in FIG. 4.
Figure 11:
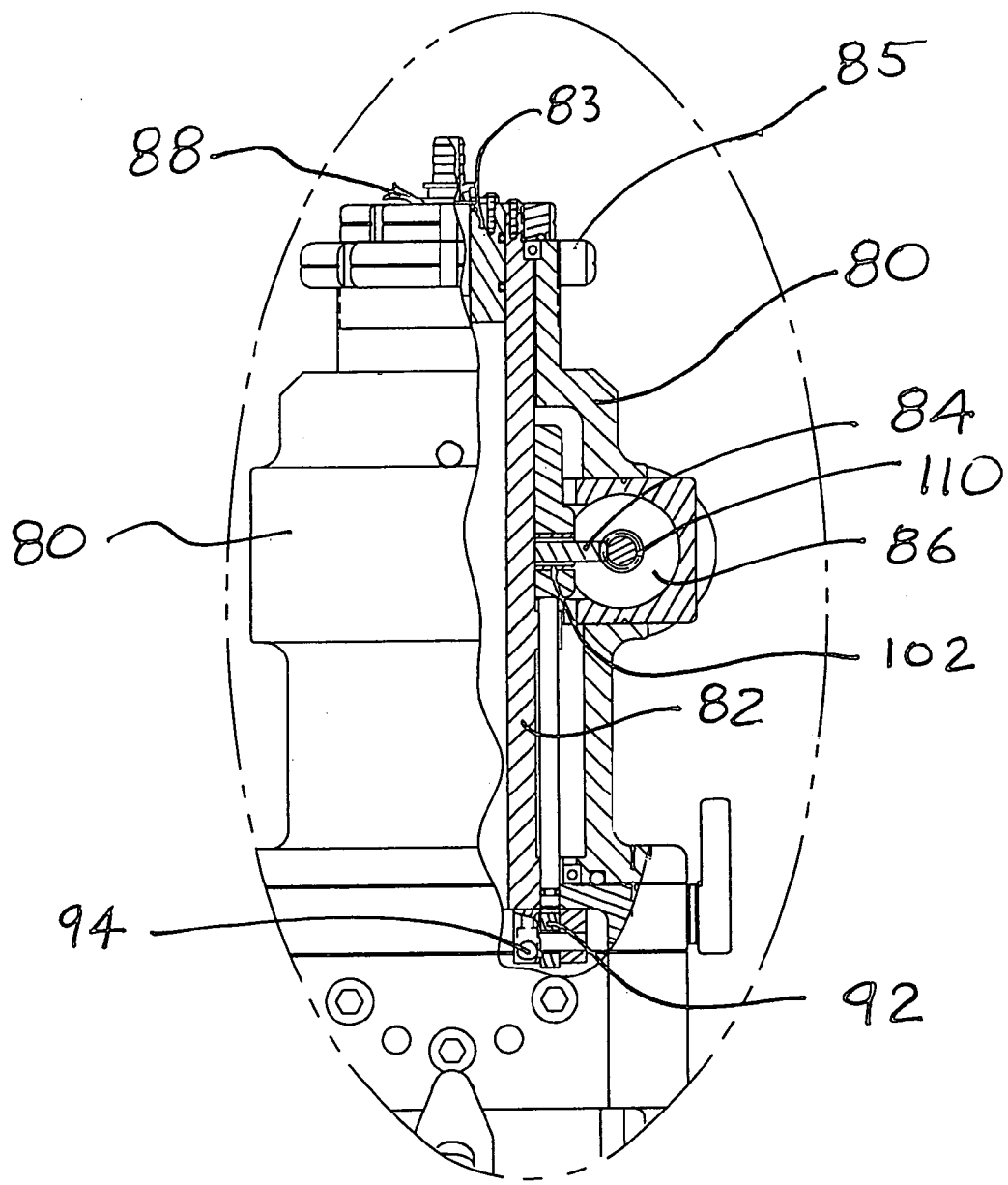
FIG. 11 is an enlarged detail view, in part section, of the pan housing shown in FIG. 10.
Figure 12:
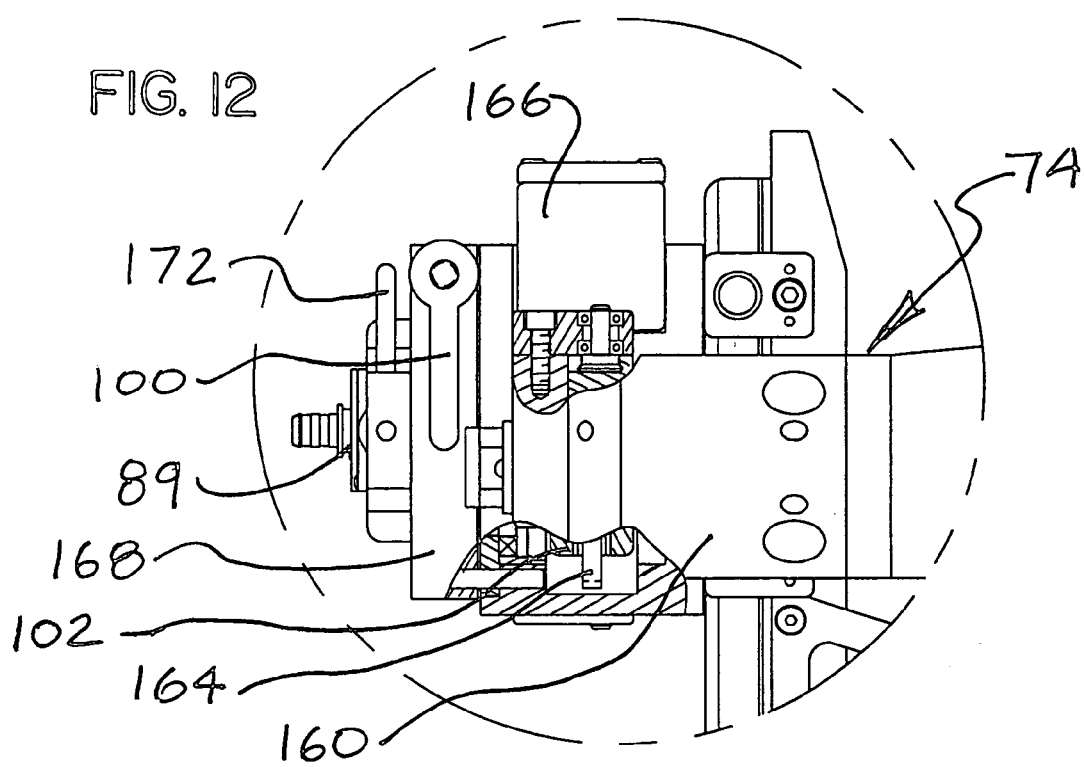
FIG. 12 is an enlarged detail view, in part section, of the roll housing shown in FIG. 10.
Figure 13:
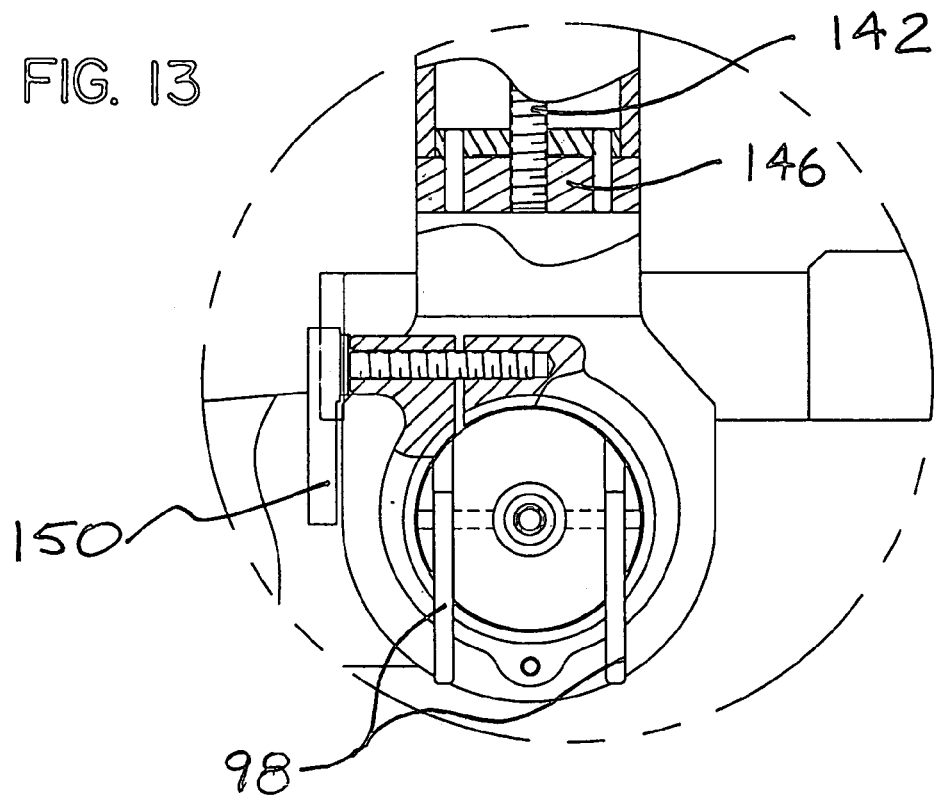
FIG. 13 is an enlarged detail view, in part section, of the tilt housing shown in FIG. 10.
Figure 14:
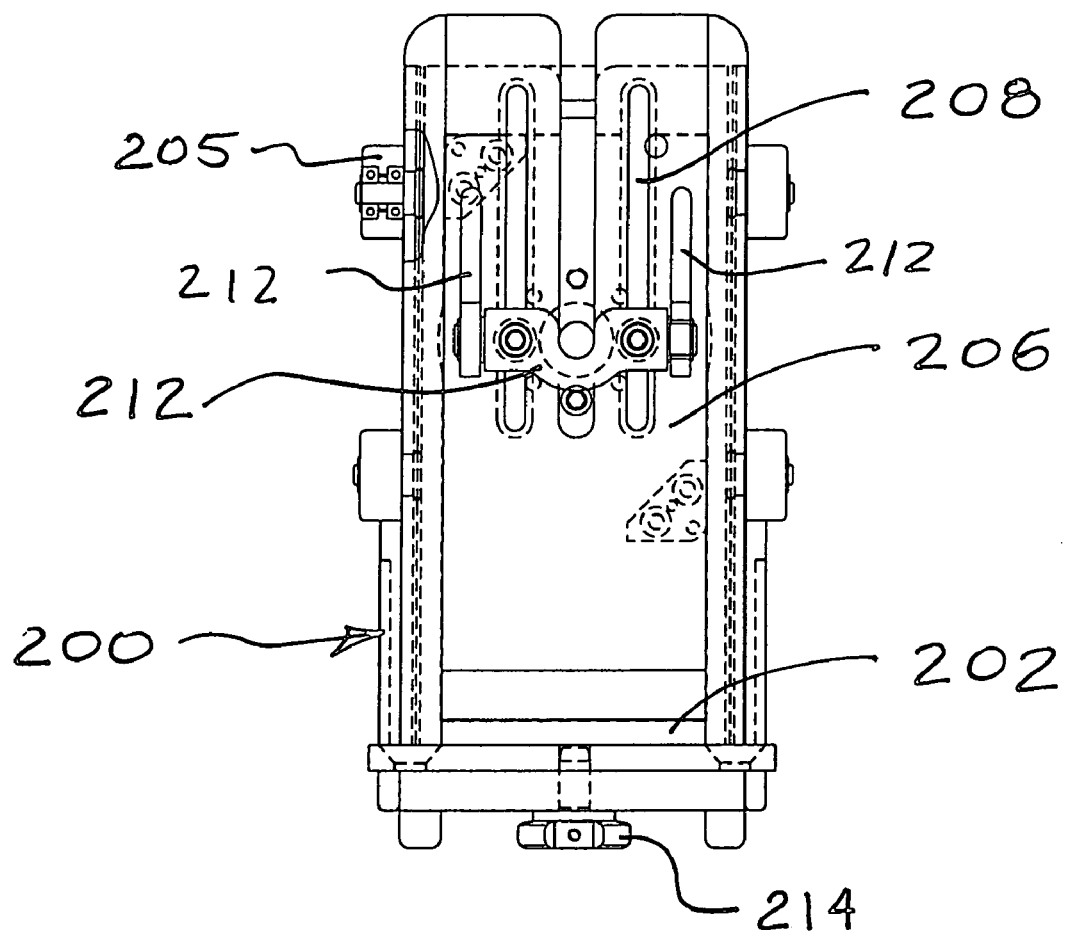
FIG. 14 is a front elevation view of the camera platform, taken along line 14—14 of FIG. 10.

Referring to FIGS. 4, 5, and 11, the pan frame 70 includes a pan housing 80 containing or supporting a pan motor 86. As shown in FIG. 11, a pan shaft 82 is joined to a top plate ring 83 which rotates relative to housing 80. A pan gear 84 is attached to the shaft 82 through a clutch assembly 102 providing overload protection and allowing disengagement for quick and easy manual operation. The electric pan motor 86 drives a worm gear 110 which meshes with the pan gear 84. A pan axis slip ring assembly 88 is supported on or in the pan housing 80, to provide electrical connections through the rotating joint. A locking nut 85 around the top end of the pan housing 80 is used to attach the camera head 50 to a crane arm or other support.

Figure 22:
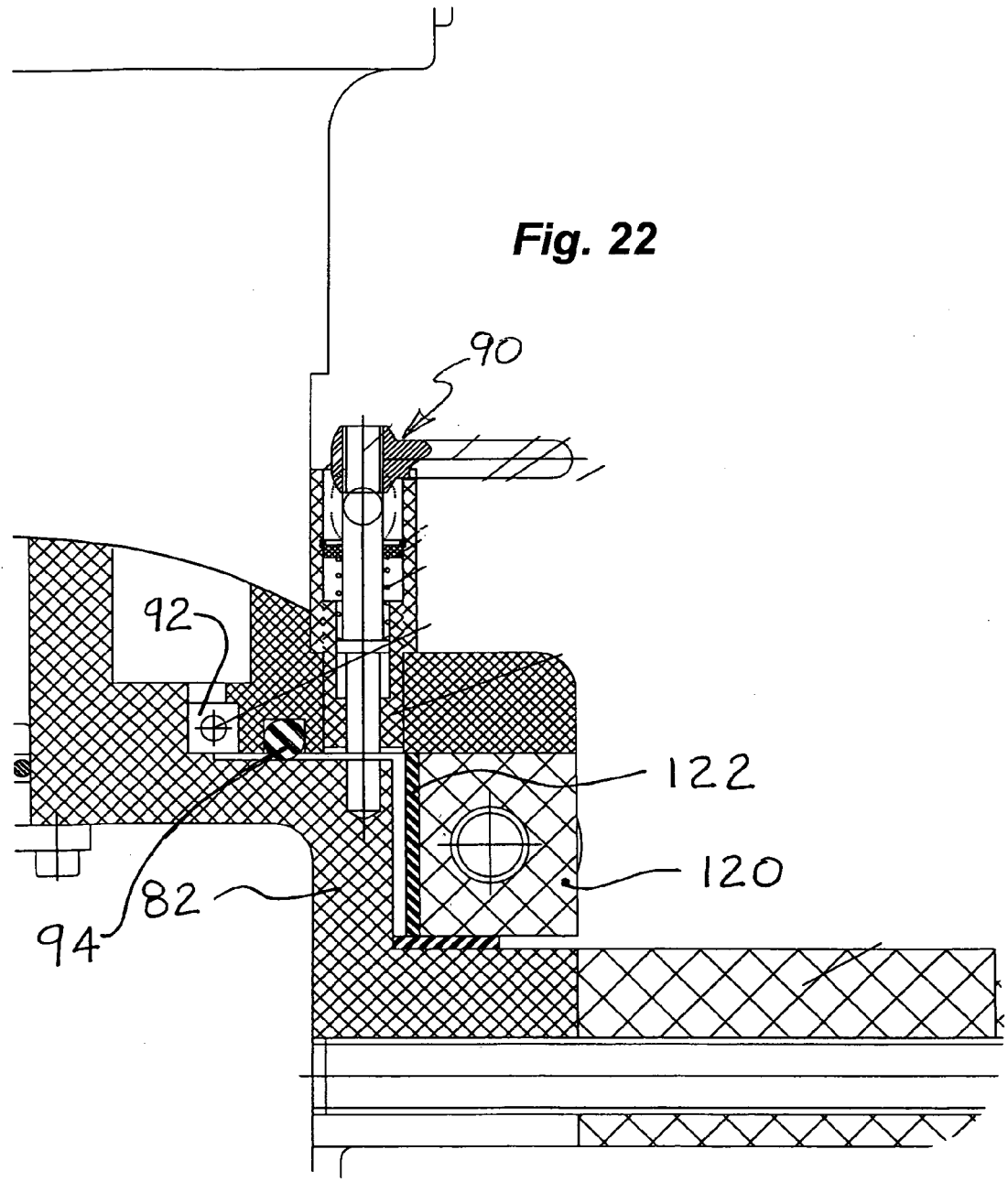
FIG. 22 is an enlarged view of the pan axis stop pin shown in FIG. 2.

Referring to FIGS. 3—5 and 22, a pan arm 96 is rotatably attached to the pan housing 80 via a sealed bearing 92. The pan arm 96 rotatably seals against the pan housing 80 via an O-ring seal 94. Referring to FIG. 11, when electrical power is applied to the pan motor 86, the worm gear 110 drives the pan gear 84 through the clutch 102 causing the pan shaft 82 to rotate. As the pan arm 96 is rigidly attached to the pan shaft 82, the pan arm 96 therefore rotates, while the pan housing 80 remains fixed in place. To prevent inadvertent relative movement of the pan arm 96, a spring biased pan axis stop pin 90 on the pan housing 80 can be engaged into an opening or hole 91 in the pan arm 96, as shown in FIGS. 2 and 22, locking them together against rotation.

Figure 9:
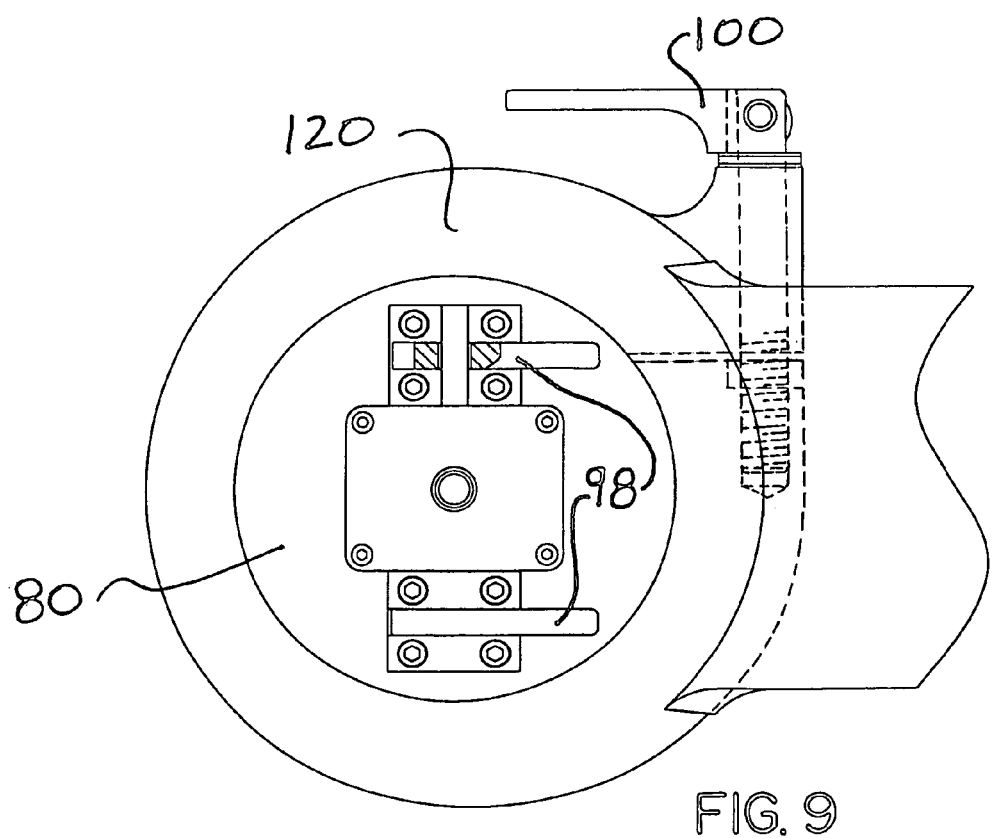
FIG. 9 is a bottom view taken along line 9—9 of FIG. 4.

Referring momentarily to FIG. 9, which is a bottom view looking up of the pan housing 80, a pair of cam engagement levers 98 lock the pan arm 96 into engagement with the pan shaft 82. For manual movement of the pan arm 96, independent of, or without use of the motor 86, the cam levers 98 are flipped over or released. This allows the pan arm 96 to rotate freely, for hand or manual positioning or movement.

Figure 20:
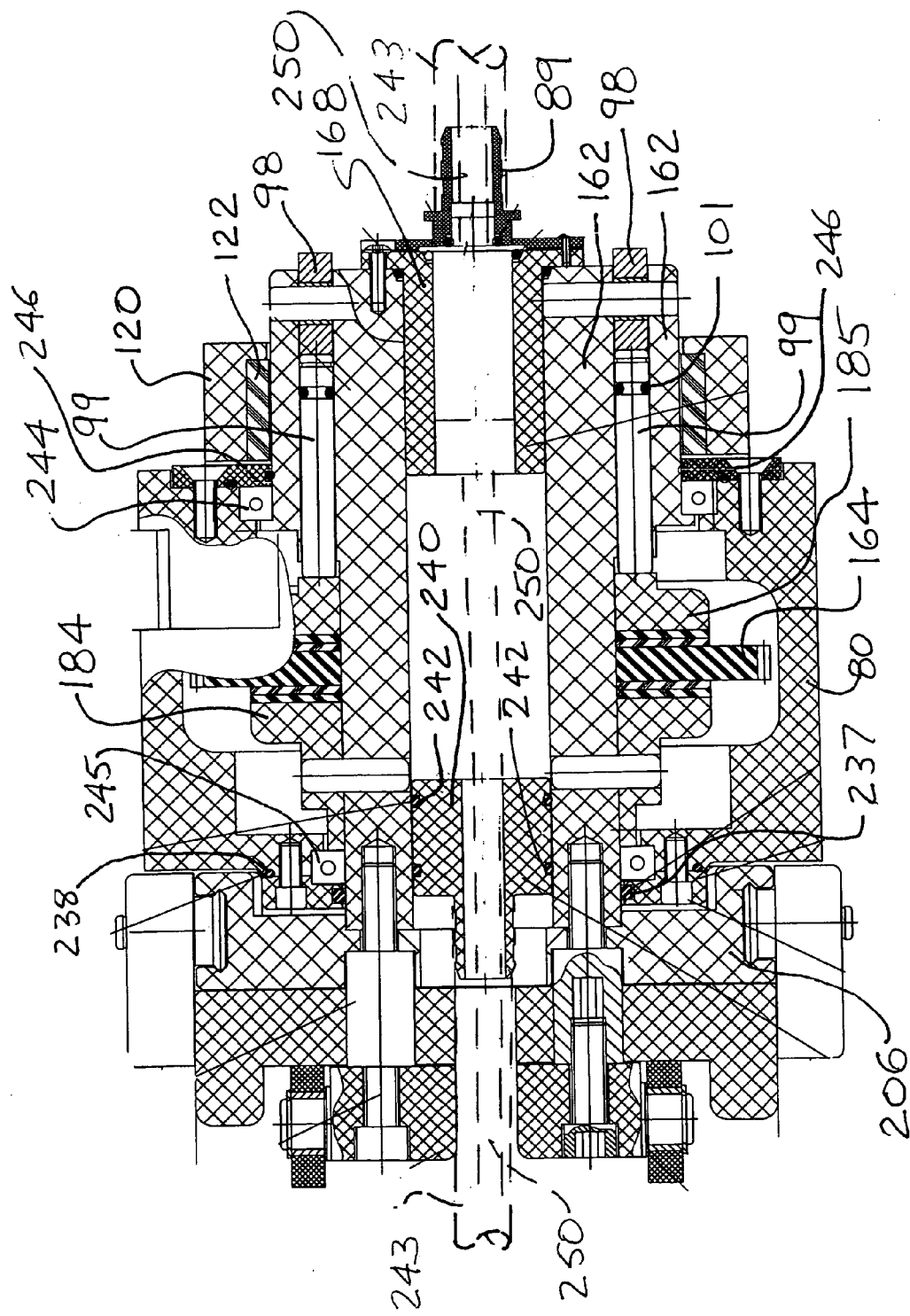
FIG. 20 is an enlarged section view of the roll housing shown in FIGS. 7, 10, and 12.
Figure 21:
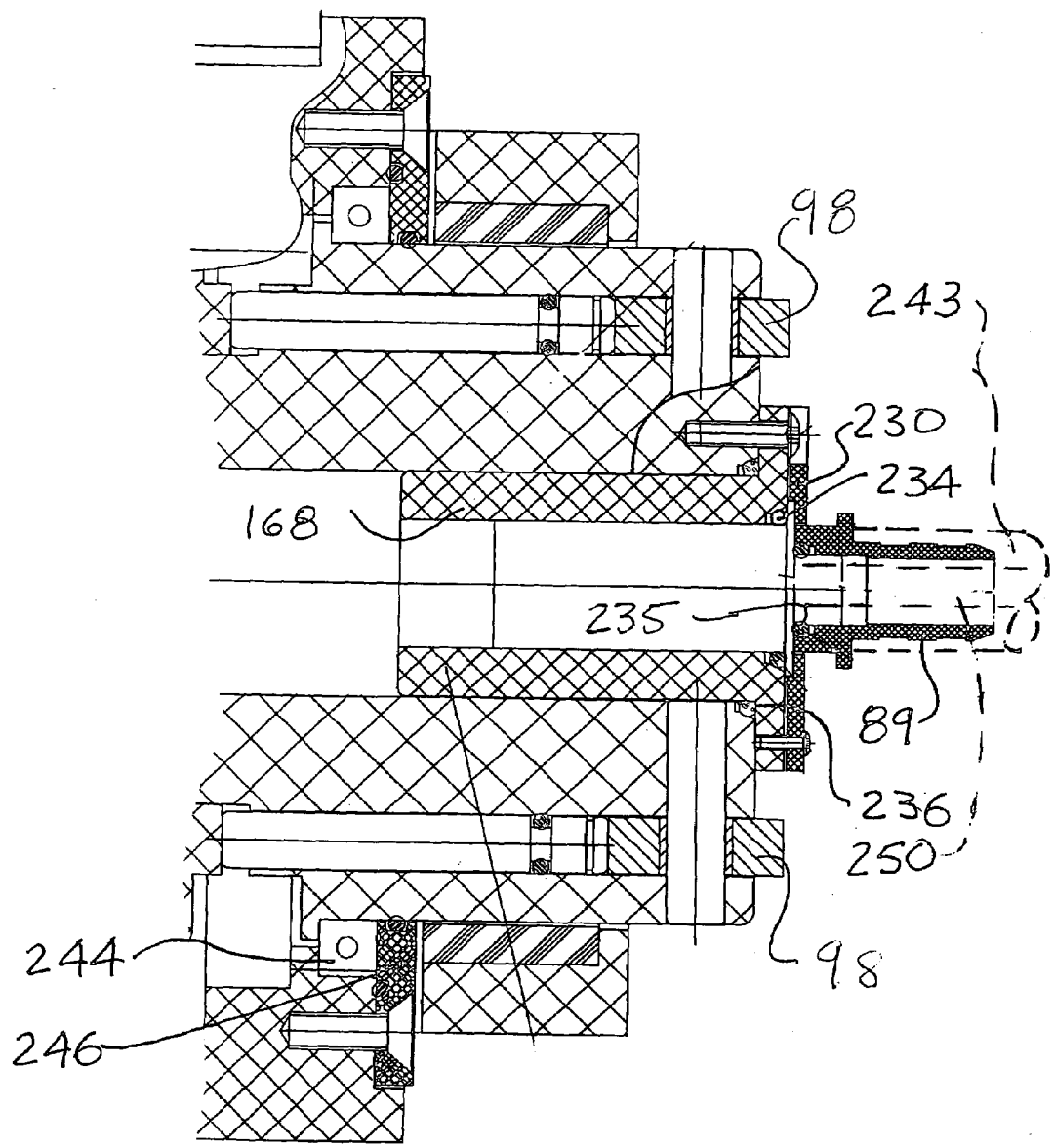
FIG. 21 is a further enlarged section view thereof.

FIGS. 20 and 21 show operation of the cam levers 98. A cam surface on each cam lever 98 rests against a clutch drive pin 99, which contacts the first or outer clutch plate 185 of the roll clutch 184. With the levers in an engaged position, the cam levers drive the clutch drive pins 99 hard against the clutch plate 185. This engages the clutch, causing the shaft 162 to rotate when the roll motor 166 is turned on. The cam levers and clutch drive pins are dimensioned to limit the maximum applied torque of the clutch to a preset limit. With the cam levers 98 flipped over (about 180 degrees), the clutch drive pins 99 are released, and the clutch is disengaged. The shaft 162, and the entire camera platform supported on the shaft 162, can then be freely rotated by hand, with minimum force. O-rings 101 on the clutch drive pins 99 seal the pins against the housing 80, while still allowing the pins to move axially.

As shown in FIG. 9, a drag lever 100 acts on a drag collar 120 around the base or bottom of the pan housing 80. A Teflon (Fluorine resins) ring 122 is positioned between the drag collar 120 and the pan shaft 82. Adjustment of the drag lever 100 increases or decreases friction on the pan arm 96. The drag lever 100 has a cam surface including flat segments to allow for incremental adjustment of drag. Similar drag adjustment is provided for the tilt and roll frames.

Figure 6:
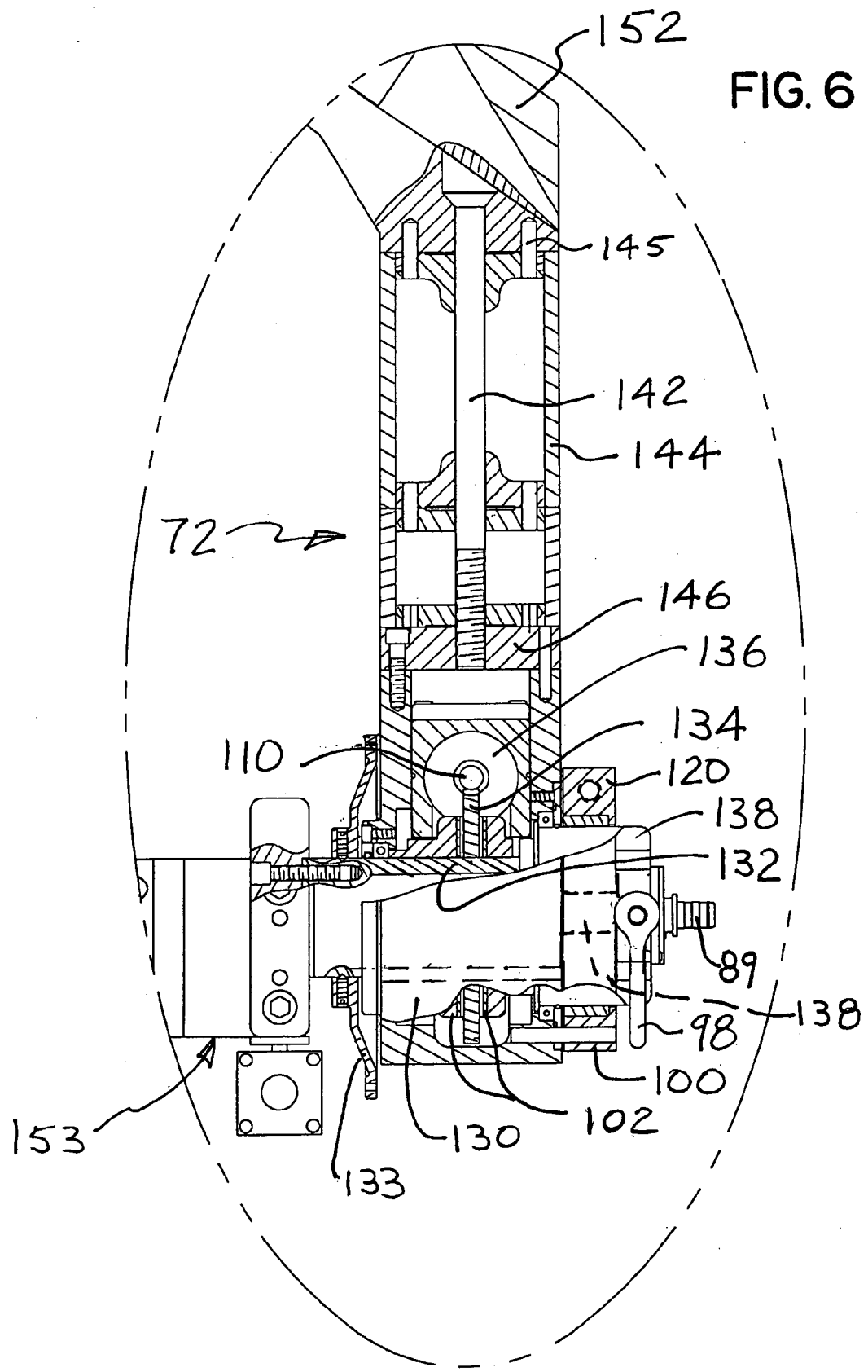
FIG. 6 is an enlarged detail view, in part section, of the tilt frame shown in FIG. 4.

Referring to FIGS. 4 and 6, the tilt frame 72 includes a tube angle 152 attached to a connecting tube 144 by an assembly bolt 142. The assembly bolt 142 engages into a bolt plate 146 within the connecting tube 144, holding the tube angle 152 at an angle (preferably about 35°) to the axis of the connecting tube 144. Of course, these components may also be perpendicular, or at other angles as well. Alignment pins 145 extend from the connecting tube 144 into the tube angle 152, to help rigidly attach them together, as shown in FIG. 6.

Figure 10:
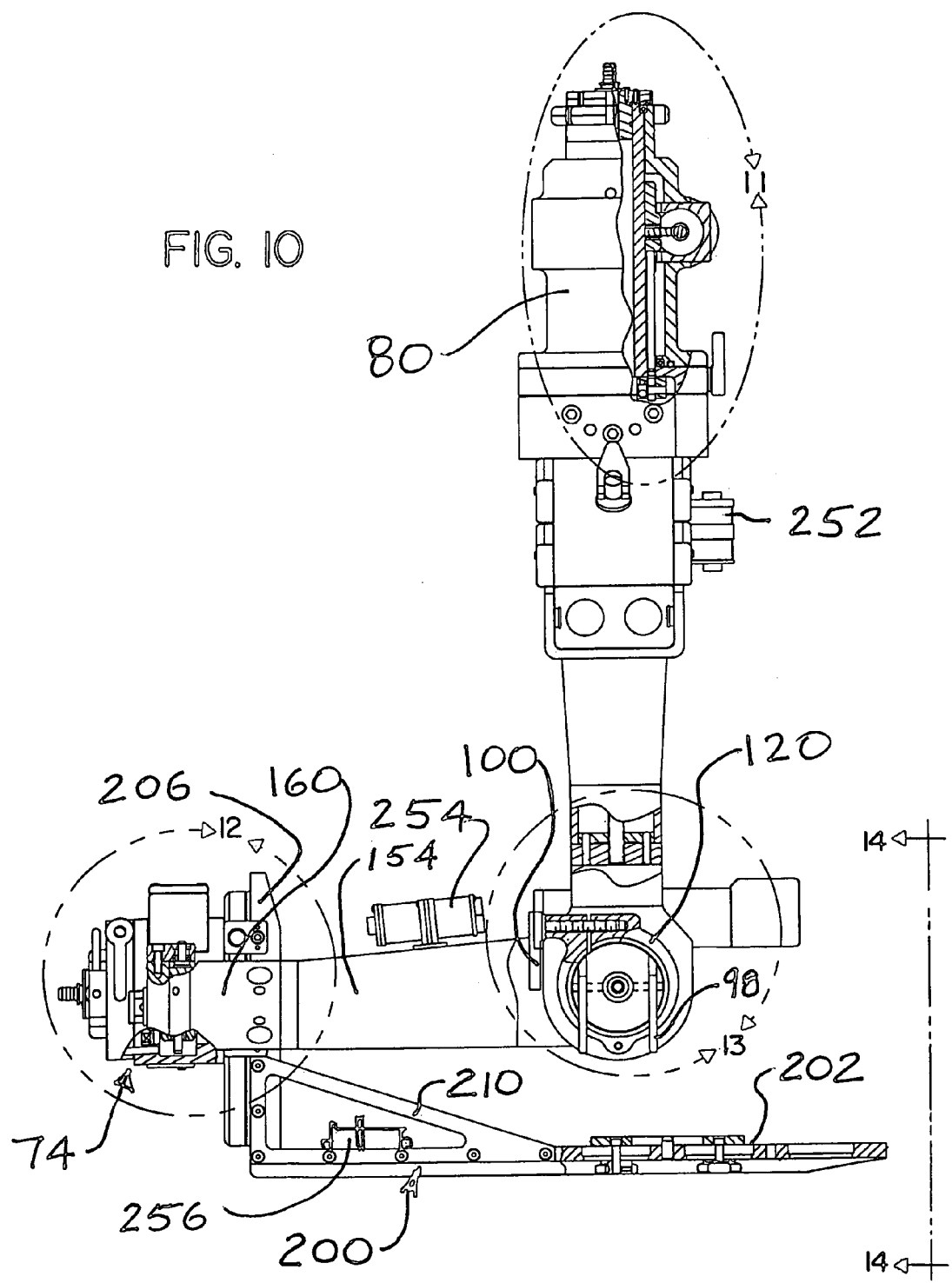
FIG. 10 is a side elevation view, in part section, of the camera head shown in FIG. 4.

Referring still to FIG. 6, a tilt axis housing 130 is attached to the connecting tube 144 at the (lower or bottom) end opposite from the tube angle 152. The tilt axis housing 130 includes components analogous to those on or in the pan axis P housing 80 as described above. Specifically, an electric tilt motor 136 on or in the tilt housing 130 has a motor shaft with a worm gear 110 meshed with a tilt axis drive gear 134. The tilt drive gear 134 is linked to a tilt axis shaft 132 through a clutch 102. A tilt arm assembly 153 is rigidly connected to the tilt shaft 132. A tilt axis slip ring assembly 138, and a tilt axis stop pin 140 are provided on or in the tilt axis T housing 130. The tilt axis stop pin 140 is similar to the pan axis stop pin 90 shown in FIG. 22, except that it is extendible into holes in a disk 133 joined to the tilt shaft 132. Referring momentarily to FIG. 10, cam release levers 98, and a drag/lock lever 100 and collar 120 are also provided on the tilt housing 130, similar to the pan housing described above.

Figure 8:
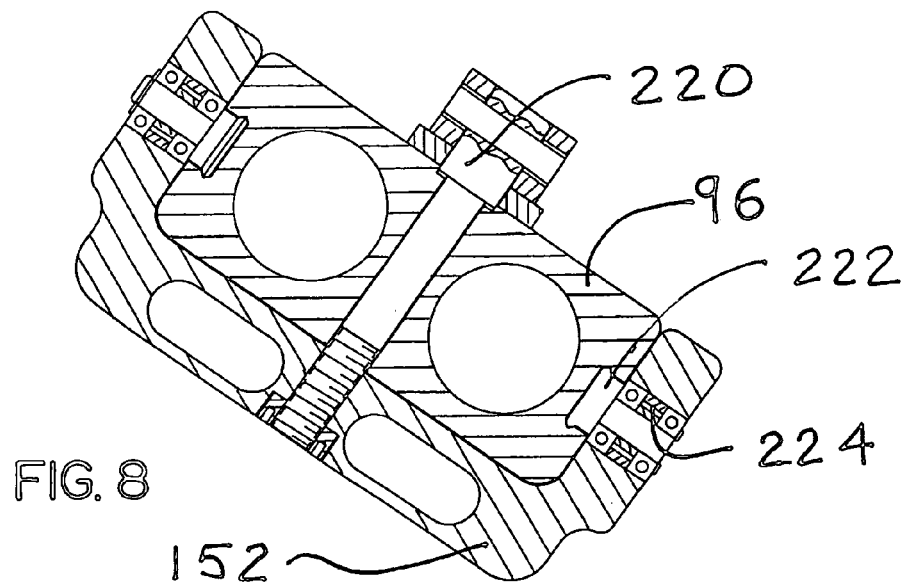
FIG. 8 is a section view taken along line 8—8 of FIG. 4.
Figure 18:
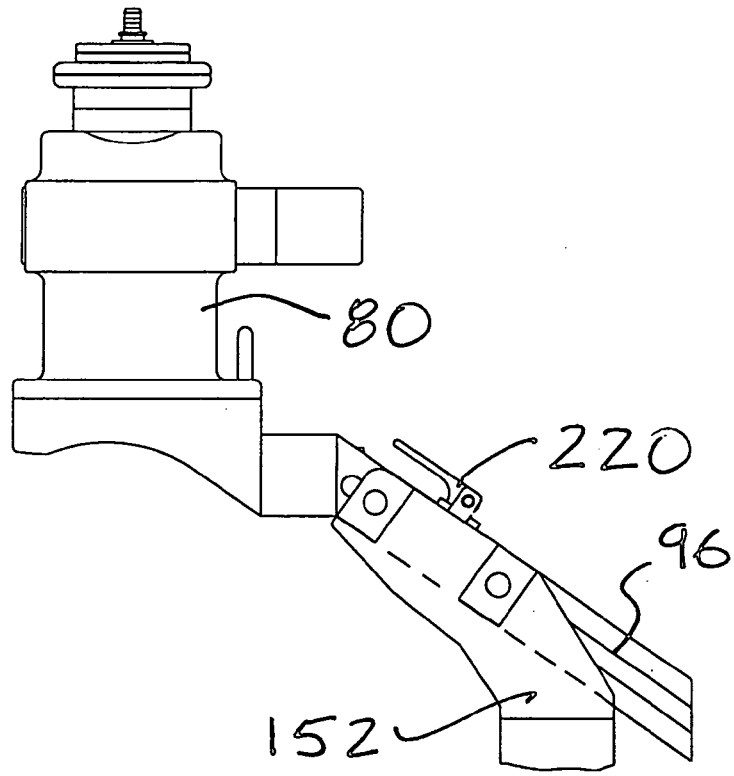
FIG. 18 is a side view showing the tilt frame in a first or retracted position on the pan frame.

Turning to FIG. 8, the tube angle 152 of the tilt frame 72 is preferably a generally U or C-shaped channel section. The pan arm 96 extends into the tube angle 152. Rollers 222 supported on bearings 224 in the tube angle 152 allow the tube angle 152 and the entire tilt frame 72, to move in or out along the pan arm 96, when the cam lock 220 is released. The rollers 222 roll and/or slide within a dovetail or undercut groove in the pan arm 96. This allows the head 50 to be moved into the alternative positions shown in FIGS. 18 and 19. As a result, the head 50 can be expanded or contracted as desired. For example, when a small size camera 60 is used, the head 50 can be positioned as shown in FIG. 18, providing a compact design, yet with adequate clearance for the camera 60, as well as any lenses, film magazines, batteries, or other accessories provided with the camera 60.

Figure 19:
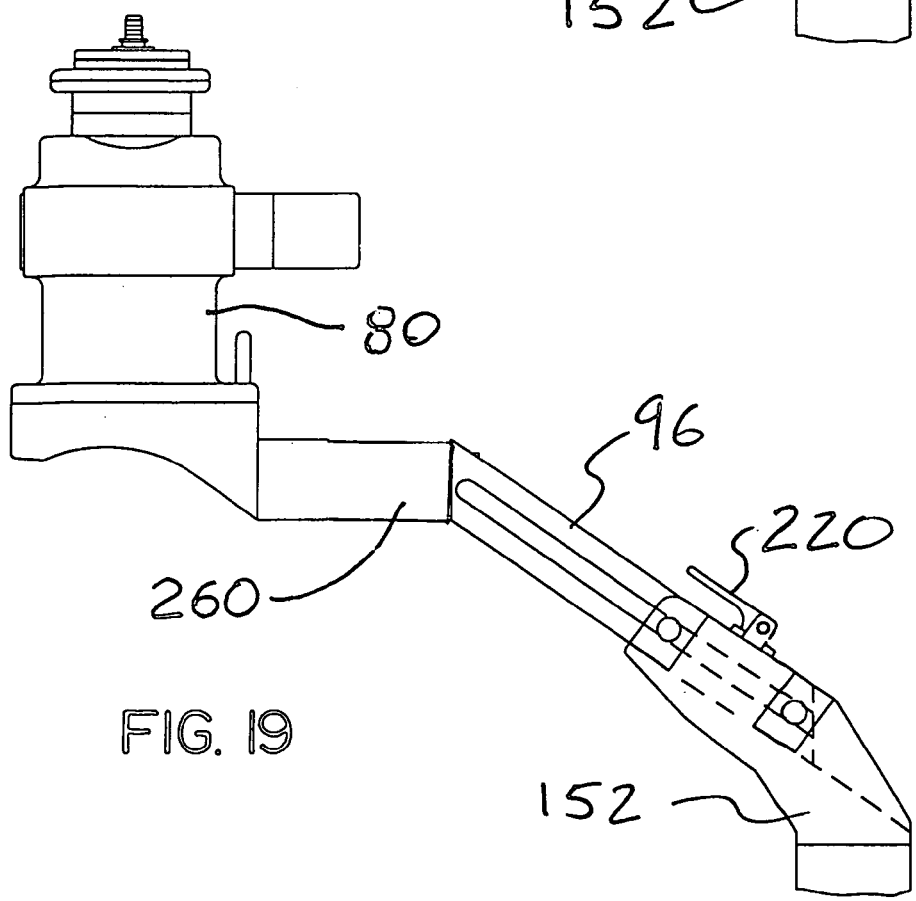
FIG. 19 is a side view thereof, showing the tilt frame in a second or extended position on the pan frame.

On the other hand, for handling large cameras, the head 50 can be expanded, as shown in FIG. 19, to provide adequate space for mounting the camera and camera accessories. Referring to FIG. 8, when the tilt frame 72 is positioned as desired on the pan arm 96, the cam lock 220 is closed by pushing the cam lever down. This creates a large clamping force which locks the tilt frame 72 into position. Teflon (fluorine containing resins) tape is advantageously placed on the bottoms and sides of the pan arm 96 and the tilt frame tube extension 158, to allow for easy sliding movement when the cam lock 220 is released. When the cam lock 220 is released or opened, a gap of about 0.01 inch opens between the pan arm 96 and the tube angle 152. The rollers 222 are then released and are free to roll, as they are no longer clamped down by the compression of the pan arm 96 against the tube angle 154 by the cam lever 220. The load or weight of the tilt frame is then carried by the rollers 222. This allows for fast and accurate low friction sliding movement of the tube angle 152, to obtain the desired size of the camera head. The cam lever 220 is then returned to the down or locked position, tightly clamping and locking the tube angle 152 and the pan arm together, in a single hand motion.

Referring to FIGS. 3 and 15, the tilt arm assembly 153 includes a tilt frame tube 154, preferably oriented perpendicular to the tilt shaft 132. A tilt frame extension section 158 is joined to the tilt frame tube 154 through an angle section 156, and is preferably generally parallel to the tilt shaft 132, and perpendicular to the tilt frame tube 154.

Referring now to FIGS. 4, 7, 10, 12, 15, and 17, the roll or dutch frame 74 includes components similar to those described above relative to the pan and roll frames. Specifically, a roll housing 160 has a motor 166 which drives a roll axis gear 164 through a worm gear 110 on the motor shaft. The angle on the worm gear 110 is selected so that the worm gears 110 can be back driven. This allows the pan, tilt, and roll frames to be manually positioned, if needed, without releasing the cam locks 98 and offers added resistance to movement when desired. The roll gear 164 drives a roll shaft 162 through a clutch 102. The clutches 102 preferably have a preset torque limit. If the limit is exceeded, the clutch slips. This helps to protect the motor, gears, as well as camera equipment on the head 50. The torque limit is high enough to allow the motors to rapidly move the pan, tilt, and roll frames. However, the torque limit is also low enough to improve the safety of persons working around the camera head, and to prevent damage to the camera head.

Figure 7:
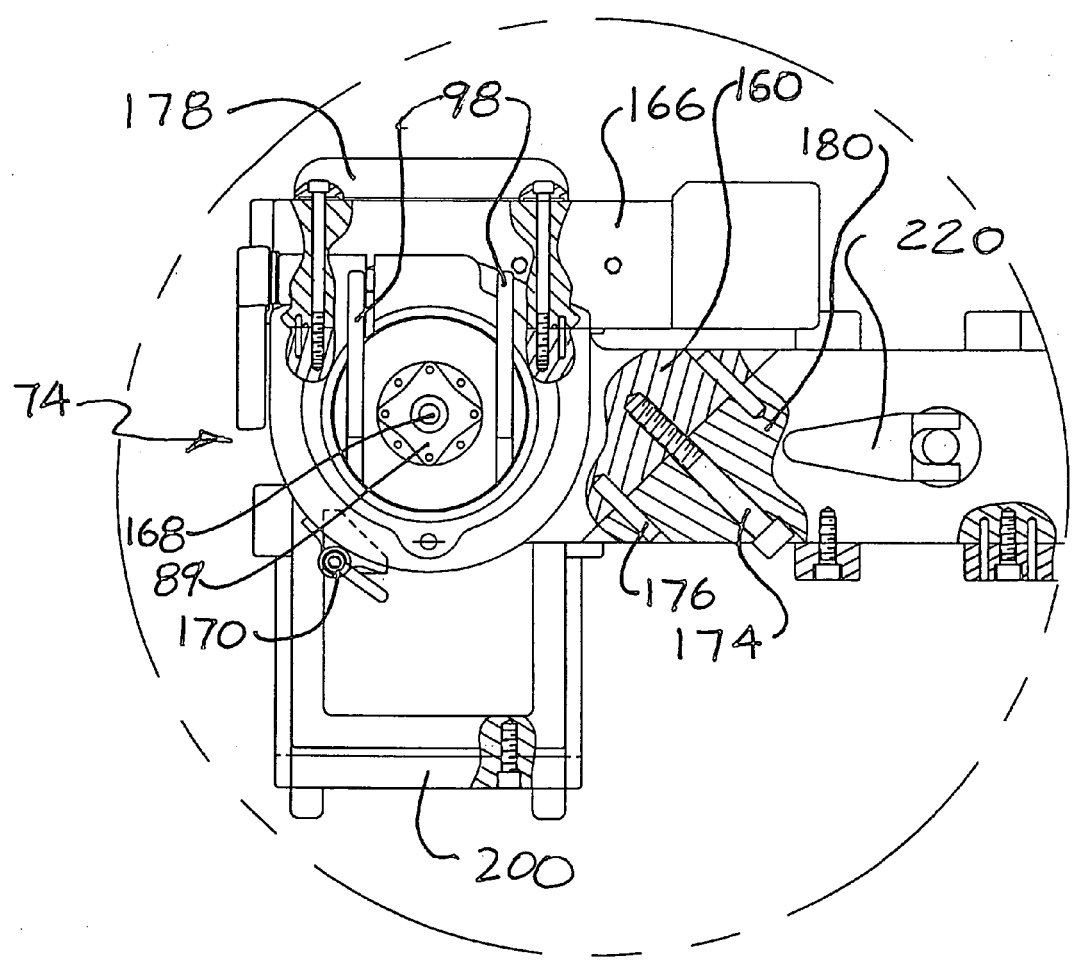
FIG. 7 is an enlarged detail view, in part section, of the roll frame shown in FIG. 4.
Figure 17:
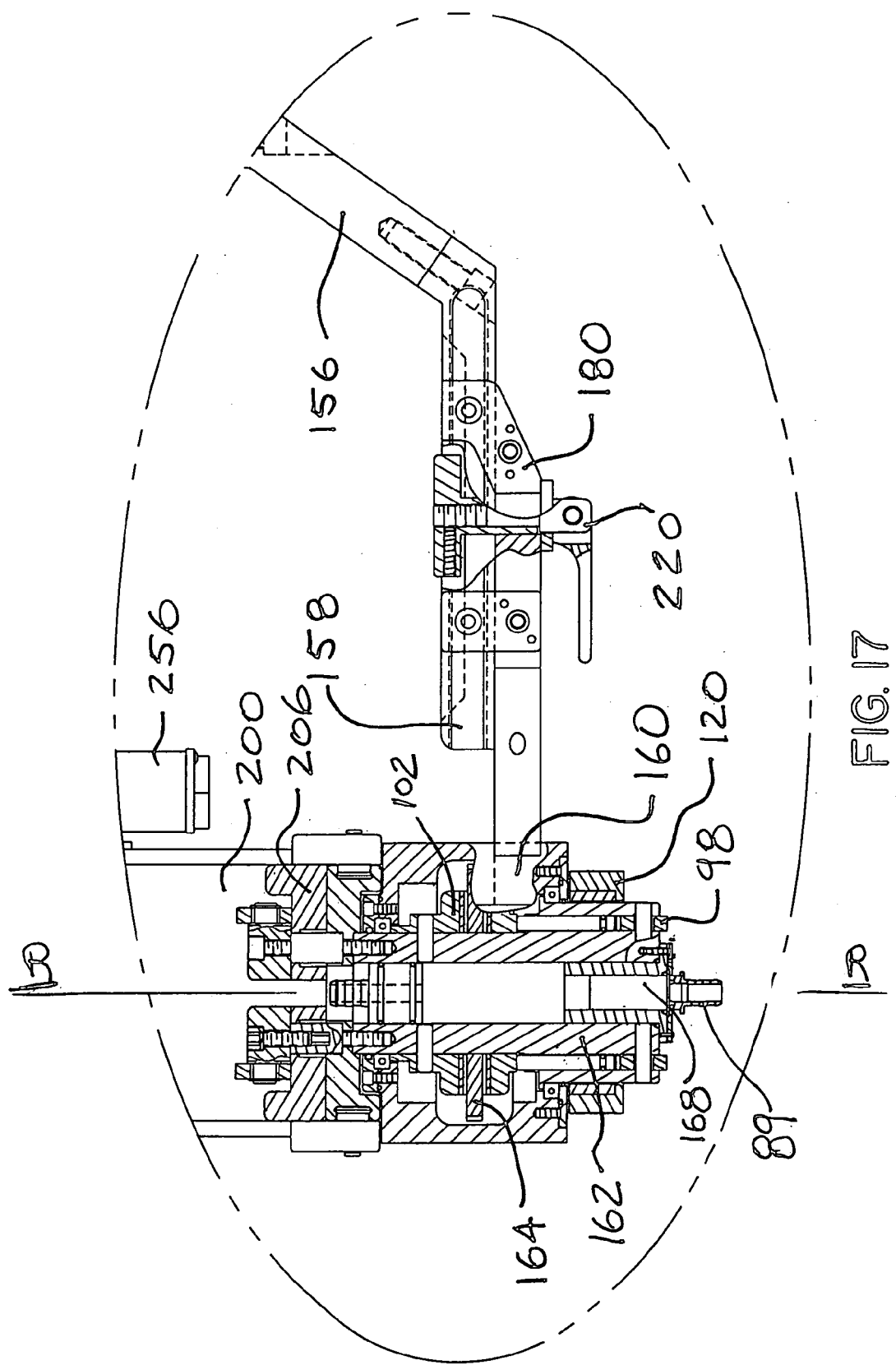
FIG. 17 is an enlarged detail view, in part section, of components of the tilt frame and roll frame shown in FIG. 15.

Referring to FIGS. 7, 17, and 20, as with the pan and tilt housings, the roll housing 160 also includes a slip ring assembly 168 and a stop pin 170, which can be engaged or locked in, to prevent any roll axis rotation. Engagement cams 98 are provided to engage and disengage the clutch 102, to disconnect the roll motor 166 from the roll shaft 162, e.g., for easy movement of the camera by hand.

As shown in FIG. 7, a roll housing arm 180 is attached to the roll housing 160 via alignment pins 176 and a connecting bolt 174. The roll housing arm 180 is attached to the tube extension 158 of the tilt arm assembly 153 via rollers and a cam lock 220, as shown in FIG. 8. This allows the roll frame 74 to move in and out relative to the tilt frame 72, in the same way that the tilt frame 72 can be moved relative to the pan frame 70, as shown in FIGS. 18 and 19.

Referring to FIGS. 2, 10, 14, and 15, a camera platform 200 is rigidly attached to the roll shaft 162. The camera platform 200 has a slotted base plate 202 attached perpendicularly to a back plate 206. Gusset plates 210 are attached to the base plate 202 and back plate 206. The vertical position of the camera platform 200 relative to the roll axis R can be adjusted by releasing cam levers 212 (shown in FIG. 14), vertically positioning the camera platform 200, via sliding movement on rollers 205, and then locking the cam levers 212. Hand bolts 214 extending up from the bottom side of the camera platform 200 are used to attach the camera 60, or an adapter plate, to the camera platform 200.

Referring back to FIG. 1, typically control, signal, power, and other electrical wires or cables leading to the camera 60 and camera accessories on the head 50 extend back up on or through the crane arm 40, to the dolly, mobile base, or other mobile support. These electrical lines allow the camera operator to remotely operate the camera and to view (e.g., on a remote monitor) the images recorded by the camera. The motors which control movement of the head, i.e., the pan motor 86, the tilt motor 136, and the roll motor 166 also require electrical connections for power and control.

Generally, the pan, tilt and roll housings have similar or identical components, and they operate the same way. FIGS. 20 and 21 show enlarged views of the roll housing 160. However, the details shown in FIGS. 20 and 21 typically apply as well to the pan and tilt housings as well. To make the camera head 50 waterproof or water resistant, the housing 160 is sealed. As shown in FIG. 20, the roll shaft 162 is rotatably supported, on a first or outer bearing 244 and a second or inner bearing 245. A shaft seal 246 seals against the roll shaft 162 against the housing 80, while allowing the shaft 162 to rotate. A second or inner shaft seal or O-ring 237 similarly seals the shaft 162 against the inner end of the housing 80. A bearing seal or O-ring 238 seals off the inner end of the housing and the inner bearing 245.

Referring still to FIGS. 20 and 21, a tube fitting or nipple 89 is joined to or part of a plate 230. Screws passing through, the plate, and the outside of the slip ring assembly 168, attach them to the housing 80. O-rings 234, 235, and 236 seal the plate 230 and the slip ring assembly 168 to the housing. A plastic or rubber tube 243 is attached to the nipple. As shown in FIG. 1, a control and power cable 250 linked to the camera 60 extends from the crane arm 40 to a tube fitting 89 on the pan housing, and from there to tube fittings 89 on the tilt and roll housings. The cable 250, or wires leading to the control cable, are contained within segments of the tube 243. The wires make a rotatable connection in each slip ring assembly (with the roll axis slip ring assembly 168 shown in FIGS. 20 and 21). The wires then extend through the shaft 162 (or the shafts 82 or 132), through a shaft plug 240, and then out of the housing 160 (or housing 80 or 130), within another section of the tube 243. The shaft plug 240 is sealed against the shaft by O-rings 242. Consequently, both the housing and the electrical connections are sealed.

To allow for quicker set up or configuration changeover, three pairs of waterproof connectors are provided. A first pair of connectors 252 is mounted on the pan frame 70, a second pair 254 is mounted on the tilt frame 72, and a third pair 256, as shown in FIG. 10, is mounted on the roll frame 74. Routing the electrical lines through the connectors allows the frames to be removed and replaced as desired, or conversion between two and three axis operation, without the need for separate handling of the electrical lines or wires. As the slip ring assemblies, connectors, wiring, and motors are sealed, the entire head 50 can be submerged, as shown in FIG. 1, without detrimental loss of performance or reliability.

Figure 23:
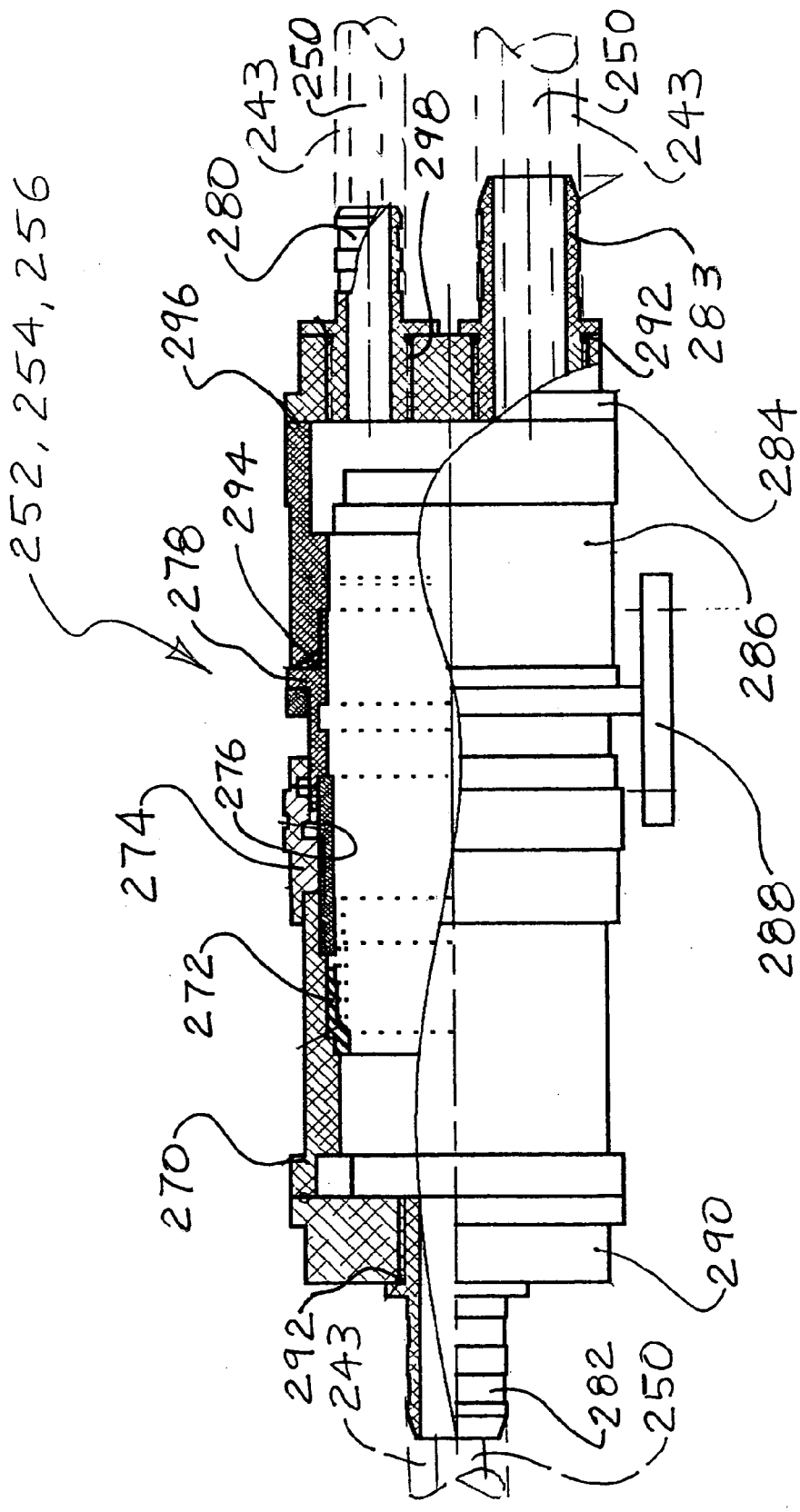
FIG. 23 is an enlarged view, in part section, of the connector pairs, shown in FIGS. 1 and 10.

Referring to FIG. 23 which shows the details of the connector pairs 252, 254, and 256, a first end cover having a first hose adapter or fitting 282 is attached (via screws) to a female housing 270. A locking collar 274 captive on the female housing 270 threads onto a male housing 286. A female half-coupling 276, and male half-coupling 278, and a compactor allow the male and female housings to be joined into a watertight connection.

A second end cover 284, having second and third hose filtings 280 and 283 is similarly attached to the end of the male housing 286. End covers 290 and 284 are secured over and around the hose filtings. A bracket 288 attached to the male housing 278 allows the connector pair to be easily attached to a flat surface on the pan, tilt, or roll frames. O-rings 292 and 296, and a packing 298, seal the hose fittings 282, 283, and 280 to the male and female housings 286 and 270. An O-ring 294 seals male half-coupling 278 to the male housing 286. This design as shown in FIG. 23 provides a waterproof connector pair, allowing for submerged operation of the camera head 50, and also providing a quick disconnect feature for electrical lines or wires running to the camera and camera accessories on the head, and/or for the electrical motors or other electrical components of the camera head itself.

Accordingly, new and dramatic camera movements, not previously readily achievable, can now be performed. For example, using the crane arm 40 and the head 50, the camera 60 can follow an action sequence beginning on land, and then moving, without interruption, into an underwater environment, such as a swimming pool, lake, etc. In addition, the head 50 can be used in wet or rainy environments, without taking protective steps, such as draping or wrapping, since the head 50 is largely impervious to water.

As shown in FIGS. 2, 4, 8, and 17, the head 50 has various hollow interior spaces. Each space is provided with purge gas ports 226, as shown in FIG. 2. for example.

By purging the interior spaces with dry nitrogen gas, the need for painting, plating, or otherwise finishing the internal surfaces of the head 50 is avoided, and internal corrosion is reduced or eliminated. As the head 50 is modular and has no covers, it can be quickly and easily serviced.

As shown in FIG. 19, an extension or spacer 260 can be installed in-between the pan frame 70 and tilt frame 72, or between the tilt frame 72 and the roll frame 74, to expand or enlarge the camera head 50, for holding unusually large or bulky cameras and/or camera accessories. A similar extension may be installed to effectively lengthen the connecting tube 144 of the tilt frame, shown in FIG. 6, or to lengthen the tube 154 or extension 158 of the roll frame 74, shown in FIGS. 3, 4, and 10.

While the drawings show a three axis camera head, the same designs described above may also be used in a two axis camera head. In the two axis design, the tilt arm assembly 153 is removed and the camera platform 200 is attached directly to the tilt shaft 132.

In use, the head 50 is mounted on a camera crane 40 or other support such as a vehicle, overhead cable trolley, etc. The overall size or envelope of the camera head 50 is adjusted, as desired, to meet the clearance space requirements of the camera and camera accessories by releasing the cam locks 220, appropriately positioning the tilt assembly 72 and the roll assembly 74, and then engaging or locking the cam locks 220. The camera is mounted onto the camera platform 200. Appropriate electrical connections are made via the connector pairs 252, 254, and 256 through the slip ring assemblies 88, 138, and 168. The camera head 50 is then balanced, using known techniques. For example, movement about the pan and tilt axes is locked out by engaging the stop pins 90 and 140. The camera is then balanced about the roll axis R. Next, rotational movement about the pan and roll axes is locked out via the locking or stop pins 90 shown in FIGS. 6, 11, and 22, and 170 shown in FIGS. 4 and 7, while the camera head 50 is balanced about the tilt axis T. The camera head 50 is then balanced about the pan axis P, in a similar way, via preventing rotational movement about the roll axis R and the tilt axis T, using the stop pins 140 and 170.

The camera head 50 provides several advantages. It can be used underwater, or in wet environments, since all bearings, motors, and electrical components and fittings are waterproof or sealed. Movement of the camera head 50 in three axes can be remotely controlled via electrical signals to the motors. Alternatively, the motors and gears can be quickly disengaged from the frames via the cam levers 98, for manual or hand control or positioning of camera movement about any of the pan, tilt, or roll axes. Even without disengaging the motors, the frames can be forcibly moved manually, as the gears 84, 134 and 164 can back drive the worm gear 110, before the clutch 102 slips, if sufficient force is applied.

The camera head 50 is also compact and lightweight. Accordingly, it can be used in confined spaces. It can also be mounted on smaller and lower load carrying capacity crane arms. As a result, filming shots or sequences can be achieved with overall more compact, lightweight, and more maneuverable and transportable equipment. The camera head 50 is also highly reliable, as it has a simplified design (in contrast to other camera heads) and it is largely sealed against water, dust, dirt, etc. The camera head 50 is also highly adaptable and can be set up to hold cameras and accessories ranging from small compact digital video cameras, to large conventional film cameras, along with associated lenses, film magazines, batteries, and other camera accessories.

Thus, a novel camera head has been shown and described. Various substitutions and use of equivalents may of course be made without departing from the spirit and scope of the invention. The invention, therefore, should not be limited, except to the following claims, and their equivalents.

What is claimed is:

1. A camera head comprising:
   a first frame;
   a first arm rotatably attached to the first frame;
   a first motor for rotating the first arm relative to the first frame, with the first motor enclosed within a sealed first housing;
   a second frame attached to the first arm;
   a second arm rotatably attached to the second frame;
   a second motor for rotating the second arm relative to the second frame, with the second motor enclosed within a sealed second housing;
   a first shaft rotatably supported within the first housing, with the second frame attached to the first shaft, and the first shaft sealed against the first housing, a first gear linked to the first shaft through a first clutch, and with the first gear linked to the first motor, and one or more clutch drive pins sealed against the first housing, and moveable from a first position, wherein the first motor drives the first shaft through the first clutch, to a second position, wherein the first shaft can rotate free of the motor.

2. The camera head of claim 1 further comprising a third frame, a third arm rotatably attached to the third frame, and a third motor for rotating the third arm relative to the third frame, with the third motor enclosed within a sealed third housing.

3. The camera head of claim 1 wherein the first and second sealed housings are waterproof, to allow for underwater operation of the camera head.

4. The camera head of claim 1 further comprising a position locking device moveable from a locked position, wherein the locking device prevents movement between the first arm and the second housing, to an unlocked position, wherein the second housing can move relative to the first arm, to adjust the size of the camera head.

5. A remote camera head comprising:
   a first frame;
   a first sealed housing on the first frame;
   a first arm rotatably attached to the first frame;
   a first motor for rotating the first arm relative to the first frame, with the first motor enclosed within the first sealed housing;
   a second frame attached to the first arm;
   a second sealed housing on the second frame;
   a second arm rotatably attached to the second frame;
   a second motor for rotating the second arm relative to the second frame, with the second motor enclosed within the second sealed housing;
   a first hollow shaft rotatably supported within the first sealed housing, with the second frame attached to the first shaft, and the first shaft sealed against the first sealed housing;
   a first gear linked to the first shaft through a first clutch, and with the first gear linked to the first motor;
   a first slip ring assembly extending into the first hollow shaft;
   a first shaft plug within and sealed against the first hollow shaft;
   a first electrical cable extending into a first end of the first slip ring assembly via a waterproof connection; and
   a second electrical cable extending through a waterproof connection in the first shaft plug and into a second end of the first slip ring assembly.

6. The camera head of claim 5 further comprising a tube adapter having a tube nipple and a base plate, with the tube adapter attached to the first slip ring assembly and to the first housing, first seal sealing the base plate to the first slip ring assembly, and a second seal sealing the slip ring assembly to the first housing, to provide a waterproof connection for wires leading into the first slip ring assembly.

7. A camera support comprising:
   a first housing having a first interior sealed space;
   a first purge gas port on the first housing connecting into the first interior sealed space, for delivering a purge gas into the first interior sealed space;
   a first motor supported by the first housing;
   a second housing having a second interior sealed space, and with the second housing linked to the first motor for rotational movement of the second housing relative to the first housing about a first axis;
   a second motor supported by the second housing;
   a second purge gas port on the second housing connecting into the second interior sealed space, for delivering a purge gas into the second interior sealed space;
   a third housing linked to the second motor for rotational movement of the third housing relative to the second housing about a second axis substantially perpendicular to the first axis; and
   a lock pin moveable between a lock position, where the lock pin extends between the first housing and the second housing, to prevent movement between them, and an unlock position, wherein the lock pin is withdrawn from one of the first and second housings, to allow rotational movement between them.

8. The camera support of claim 7 with the second housing linked to the first motor by a first arm, and with the second housing securable onto the first arm at multiple positions on the first arm, and with third housing linked to the second motor by a second arm, and with third housing securable onto the second arm at multiple positions on the second arm.

9. The camera support of claim 7 further comprising an adjustable brake to set braking force against rotation of the second housing about the first axis.

10. A camera support comprising:
    a first housing having a first interior sealed space;
    a first purge gas port on the first housing connecting into the first interior sealed space, for delivering a purge gas into the first interior sealed space;
    a first motor supported by the first housing;
    a second housing having a second interior sealed space, and with the second housing linked to the first motor for rotational movement of the second housing relative to the first housing about a first axis;

a second motor supported by the second housing;

a second purge gas port on the second housing connecting into the second interior sealed space, for delivering a purge gas into the second interior sealed space;

a third housing linked to the second motor for rotational movement of the third housing relative to the second housing about a second axis substantially perpendicular to the first axis a first shaft rotatably supported within the first housing, with the second housing attached to the first shaft, and the first shaft sealed against the first housing, a first gear linked to the first shaft through a first clutch, and with the first gear linked to the first motor, and one or more clutch drive pins sealed against the first housing, and moveable from a first position, wherein with first motor drives the first shaft through the first clutch, to a second position, wherein the first shaft can rotate free of the motor.

* * * * *